United States Patent [19]
Mims, III

[11] 4,237,646
[45] Dec. 9, 1980

[54] PORTABLE FISH CATCHER

[76] Inventor: Priestly G. Mims, III, 404 Georgia Rd., Chesapeake, Va. 23321

[21] Appl. No.: 931,245

[22] Filed: Aug. 4, 1978

Related U.S. Application Data

[63] Continuation-in-part of Ser. No. 800,176, May 26, 1977, abandoned.

[51] Int. Cl.³ .............................................. A01K 71/00
[52] U.S. Cl. ........................................ 43/103; 43/10; 43/105
[58] Field of Search ................ 43/102, 100, 103, 105, 43/10

[56] References Cited

U.S. PATENT DOCUMENTS

| | | | |
|---|---|---|---|
| 1,761,365 | 6/1930 | Reed | 43/102 |
| 2,163,973 | 6/1939 | Benca et al. | 43/100 |
| 2,716,304 | 8/1955 | Taylor | 43/100 |
| 3,314,187 | 4/1967 | Marcinkowski | 43/105 |
| 3,935,811 | 5/1960 | Hurtig | 43/105 |

FOREIGN PATENT DOCUMENTS 91777 3/1938 Sweden ...................................... 43/100

*Primary Examiner*—James L. Jones, Jr.
*Attorney, Agent, or Firm*—William F. Frank

[57] ABSTRACT

The portable fish catcher comprises a fish trap of a type employing gill netting which is attached at top and bottom respectively to a pair of rings which may be oval, triangular, rectilinear, round, or other geometrical configuration. Additional steadiness of the catcher is provided by flexible lines interconnecting the two rings which lines are placed on the inside of the gill netting. The top ring has attached thereto a float so that when the catcher is placed in the water, the weight of the rings extends the catcher downwardly. Bait is suspended within the catcher by attachment to the tilt ring or to the float. The float attached to the top ring has means thereon for attaching a line so that the catcher may be retrieved. The weight of the rings causes the catcher to be extended to the full length of the interconnecting lines. When the catcher is not in use, it collapses to the height of the diameter of the two rings plus the float.

1 Claim, 5 Drawing Figures

PORTABLE FISH CATCHER

PRIOR APPLICATIONS

This application is a continuation-in-part of U.S. Ser. No. 800,176 filed May 26,1977, now abandoned upon the filing of this application.

FIELD OF THE INVENTION

The present invention is in the field of catching fish and more particularly provides a portable fish catcher for trapping fish at their gills.

BACKGROUND OF THE INVENTION AND PRIOR ART

While the sport of catching fish by means of a conventional baited hook is a pleasant past time, it is time-consuming and requires constant presence of the fisherman. It also normally produces only one fish per hook. The use of trot lines, which are suspended below water with a plurality of hooks increases, of course, the productivity of the catch and does not require constant attendance. Use also is made of nets stretched across bodies of water to entrap fish at their gills. Such nets have a mesh which is somewhat selective in that it allows very small fingerlings to pass through, and yet will catch the larger fish of the species as they insert their heads through the net openings. Since the gills are normally forward of the largest part of the fish's body, the fish will protrude the gill-bearing portion of the head through the opening in the netting until such time as the netting comes into contact with the fish's body. Generally, at this point, fish will extend their gills and attempt to back off at which point the gills then become entangled with the twine or line forming the mesh. The fish cannot move forward because the mesh is too small to permit passage of the body, and the fish cannot move backward because its gills catch in the netting. Such gill nets are usually of a great length and have floats mounted along a float or cork line, and have weights along the bottom anchor line in order to keep them substantially vertical in the water.

Portable type fish traps generally consist of a cylindrical arrangement which lies with its long axis parallel to the current flow, the ends each having a conical inwardly extending form so that the fish may swim into the conical opening, but once inside the trap appear to be unable to find the opening through which they entered and are thus retained within the trap. This type of fish trap is disclosed U.S. Pat. No. 3,800,464.

Italian Pat. No. 639,323 discloses a portable fish catcher of generally cylindrical form which is suspended below the surface of the water from floats. The fish catcher disclosed herein utilizes the principal of gill net but each end has a plurality of substantially rigid members spaced across the end. The members have protrusions thereon which are for the prupose of catching the fish by the gills once the head has protruded through the members. The device disclosed in this patent is rigid both as to the end members as well as the interconnecting walls and the gilling members.

SUMMARY OF THE INVENTION

The present invention has the flexibility and collapsibility associated with the conventional gill net, but has the portability associated with the fish traps described above. The present invention is designed to be employed in a vertical position wherein the weight of its major end members provide the means whereby the catcher is extended beneath the water surface to a distance compatible with the buoyant capacity of the float which is attached to the upper end. It is not essential that the float remain on the surface of the body of water in which the catcher is employed. The float serves primarily to cause the catcher to be extended fully. The material forming the end rings may be metal or plastic or wood. If metal or plastic, the material may be solid or hollow. If metal or plastic and hollow, the bottom ring may be filled with water to the extent necessary to provide the weight required to cause the net to be extended to the full length of the catcher beneath the water's surface, and the upper ring may be without filler to provide additional buoyancy. While use of wooden top ring would provide some buoyancy and relieve the requirement for a large float, use of a wooden bottom ring would require the addition of weight thereto to properly extend the catcher.

BRIEF DESCRIPTION OF THE DRAWINGS

The present invention is described in the following drawings which are at varying scales as required to fully show the invention, and are illustrative only as to configuration and size.

DETAILED DESCRIPTION OF THE INVENTION

Figure 1:
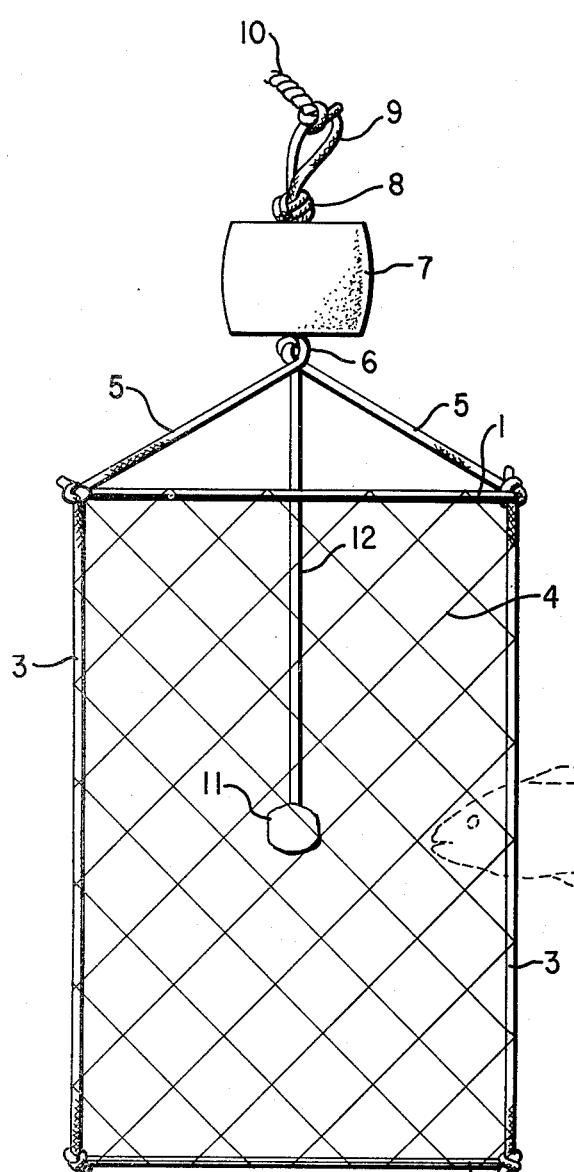
FIG. 1 is an elevation view of the present invention in its deployed state.
Figure 2:
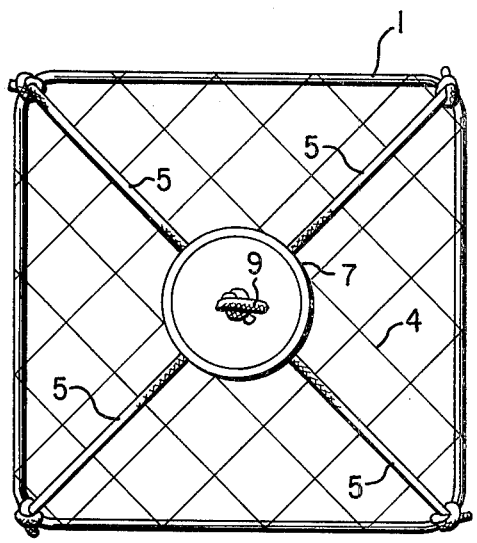
FIG. 2 is a top plan view of the present invention.

In FIG. 1 there will be seen a support or flotation ring 1 connected to a bottom or anchor ring 2 by means of a plurality of flexible lines 3. Attached to rings 1 and 2 and encompassing support lines 3 is a gill netting 4 which forms an enclosure around the rings and lines 3. Attached to the support or flotation ring 1 are three or four retaining lines 5. In the configuration shown in FIG. 2, it will be seen that there are four such support lines 5. Should a circular configuration be used for the ring, three or four such support lines could be employed. Support lines 4 meet at a common point 6, shown in FIG. 1 as a knot above which a float 7 is attached and secured, as shown in FIG. 1 by another knot 8, and terminating in a loop 9 to which a retrieval line 10 is attached. While the size of mesh in the gill netting 4 shown in FIG. 1 seems large, it is for illustrative purposes only and can be the size determined necessary for the species of fish to be caught. Various means (not shown) can be used to secure the netting to the rings, such as clamps, ties, a continuous line spirally wound around the ring through the mesh openings. It would be readily apparent that this structure readily lends itself to an easy interchange of size of gill netting without disturbing the usability of the device.

The gill netting 4 extends over the top and bottom of the catcher and an opening in the top and bottom portion of the gill net (not shown) is provided in order to place bait 11 on bait suspension line 12 which is suspended from the juncture 6 of the support lines 5.

Figure 4:
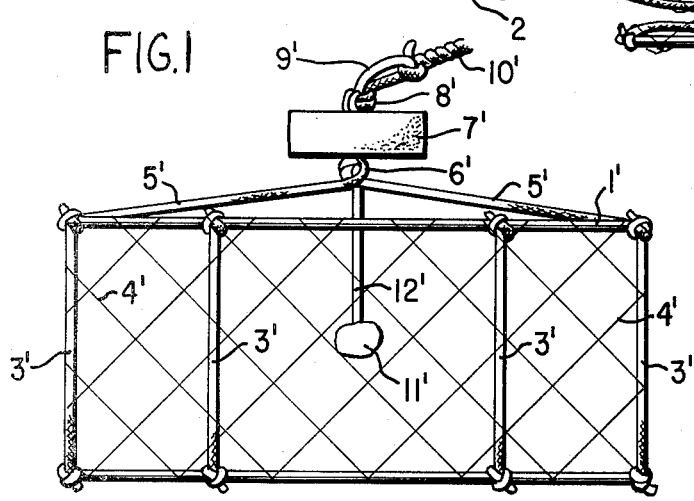
FIG. 4 is an elevation view of a second embodiment of the invention.

The embodiment shown in FIG. 4 might be used advantageously in a body of water having a current. Since it is constructed in the same manner as FIG. 1, the same reference numerals with a "prime" describe the same components. Since the catcher of the embodiment has less depth when extended by the anchor or bottom ring, it could be employed in waters too shallow to use the embodiment of FIG. 1.

Figure 3:
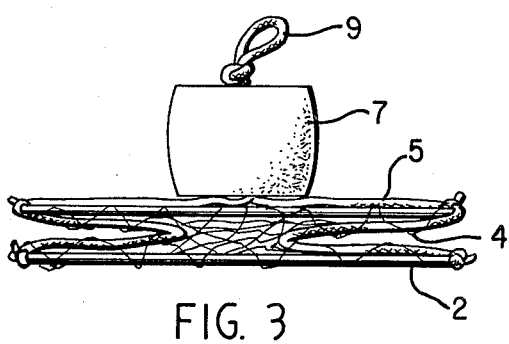
FIG. 3 is an elevation view of the present invention in its collapsed state.
Figure 5:
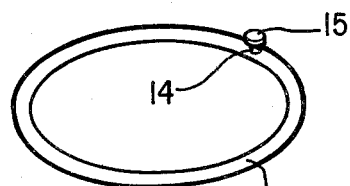
FIG. 5 is a perspective view of one of the rings employed in the invention.

In FIG. 5, the ring, be it the support or flotation ring, or the anchor or bottom ring, is a hollow, tubular material 13 having a filling nipple 14 with suitable closure therefor 15. When the hollow form of the ring is employed as the anchor or bottom ring, the closure 15 can be omitted so that the ring will then become self-filling and weighting, thus providing the necessary downward drag on the device to fully extend it to the position shown in FIG. 1 from that shown in FIG. 3. If the depth to which the catcher is to be placed requires additional submersion, the float 7 can be made smaller or the support or flotation ring can be filled with water to the extent necessary to provide sufficient weight to sink the net. Generally speaking, it has been found that when a hollow material is employed for the anchor or bottom ring, it will be of larger diameter than the support or flotation ring. It is to be recognized that the self-filling aspect of the anchor or bottom ring described above may not submerge the catcher below the desired point. In such an instance, the necessary liquid or even a solid, such as sand, would be placed in the support or floatation ring to the amount necessary to provide the desired weight and then the closure would be placed over the filling nipple.

It will be seen that the use of a hollow support or flotation ring of sufficiently large diameter could provide the required buoyancy and thus eliminate the use of a separate float.

While those of skill in the art will recognize that variations in the shape and materials employed may vary from that disclosed herein, the scope of the invention lies in the following claims thereto.

What is claimed is:

1. A collapsible and portable fish catcher comprising a support ring and an opposed anchor ring interconnected by a plurality of flexible, elongated means, gill netting means attached to said rings and encompassing said rings and said flexible members to provide an enclosure, floatation means attached to said support ring and external of the enclosure to suspend said catcher in a body of water whereby the anchor ring will extend the elongated means to position the catcher in an extending and floating position, and means depending from said float means to position bait within the enclosure; said rings being made of material selected from the group consisting of metal, plastic, and wood, at least one of said rings being made of a material selected from the group consisting of hollow metal and hollow plastic, said at least one of said rings having a filling nipple and enclosure therefor; said gill netting means comprising gill netting of predetermined sized openings to engage and hold a fish by its gills, and removable means to attach said netting to said ring-like members to permit interchange of gill netting according to the size of fish to be caught, said removable means being selected from the group consisting of clamps, ties, and a continuous line spirally wound around each ring through the openings in said netting.

* * * * *